United States Patent
Hanaoka et al.

(10) Patent No.: US 6,711,179 B1
(45) Date of Patent: Mar. 23, 2004

(54) SIGNAL PROCESSING APPARATUS WITH THREE LAYER PROCESSING SECTIONS, AND SIGNAL PROCESSING SYSTEM WITH SAID TWO SIGNAL PROCESSING APPARATUSES

(75) Inventors: Kunihiro Hanaoka, Kobe (JP); Shoji Akashita, Shinagawa-ku (JP); Osamu Tomioka, Shinagawa-ku (JP); Mitsukazu Kurose, Suwa (JP)

(73) Assignees: Kobe Steel, LTD., Hyogo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/474,753

(22) Filed: Dec. 29, 1999

(30) Foreign Application Priority Data

Feb. 26, 1999 (JP) .......................................... P11-049806

(51) Int. Cl.$^7$ ................................................. H04J 3/24
(52) U.S. Cl. ...................................... 370/474; 709/232
(58) Field of Search ................................. 370/236, 419, 370/428, 474; 709/230, 231, 232, 253; 710/20, 21, 33, 52

(56) References Cited

U.S. PATENT DOCUMENTS

| | | | |
|---|---|---|---|
| 4,703,475 A | | 10/1987 | Dretzka et al. |
| 4,941,089 A | * | 7/1990 | Fischer ........................ 709/231 |
| 5,912,903 A | * | 6/1999 | Nakayashiki et al. ........ 714/749 |
| 5,915,127 A | * | 6/1999 | Ogawa et al. ................. 710/58 |
| 6,073,180 A | * | 6/2000 | Onoda et al. ................ 709/234 |
| 6,185,620 B1 | * | 2/2001 | Weber et al. ................ 709/230 |
| 6,233,637 B1 | * | 5/2001 | Smyers et al. ............... 710/311 |
| 6,243,778 B1 | * | 6/2001 | Fung et al. .................. 710/113 |
| 6,425,019 B1 | * | 7/2002 | Tateyama et al. ............. 710/11 |
| 6,445,718 B1 | * | 9/2002 | Muto ........................... 370/474 |
| 6,457,079 B1 | * | 9/2002 | Hanaoka et al. ............. 710/105 |
| 6,523,058 B1 | * | 2/2003 | Fung et al. .................. 709/100 |
| 6,580,711 B1 | * | 6/2003 | Muto ........................... 370/389 |
| 6,584,103 B1 | * | 6/2003 | Hanaoka et al. ............. 370/389 |

FOREIGN PATENT DOCUMENTS

JP 10-93623 4/1998

OTHER PUBLICATIONS

Technical Editor, Peter Johansson, "Serial Bus Protocol 2 (SBP-2)," Working Draft, American National Standard for Information Systems, T10, Project 1155D, Revision 4, pp. 1–95 (May 19, 1998).
Gary Hoffman and Daniel Moore, "IEEE 1394: A Ubiquitous Bus", IEEE (1995), pp. 334–338.
European Search Report dated Nov. 7, 2002.

* cited by examiner

Primary Examiner—Hassan Kizou
Assistant Examiner—Dmitry Levitan
(74) Attorney, Agent, or Firm—Reed Smith LLP; Stanley P. Fisher, Esq.; Juan Carlos A. Marquez, Esq.

(57) ABSTRACT

Provided is a signal processing apparatus including upper, intermediate and lower layer processing sections. The lower layer processing section includes a first storage unit having a first memory capacity of a limited size for transfer data. The intermediate layer processing section includes a second storage unit having a second memory capacity larger than the limited size. The upper layer processing section transmits the transfer data of a size, larger than the first memory capacity and not larger than the second memory capacity, to the intermediate layer processing section. The intermediate layer processing section receives the transfer data, divides the data into plural divided data each having a size not larger than the limited size, and transmits the data to the lower layer processing section. Being untransmitted divided data, the intermediate layer processing section transmits this data to the lower layer processing section without transmitting any response signal.

16 Claims, 8 Drawing Sheets

SECOND EXAMPLE OF PRIOR ART

SIGNAL PROCESSING APPARATUS WITH THREE LAYER PROCESSING SECTIONS, AND SIGNAL PROCESSING SYSTEM WITH SAID TWO SIGNAL PROCESSING APPARATUSES

BACKGROUND OF THE INVENTION

1. Field of the Invention

The present invention relates to a signal processing apparatus and a signal processing system, and more particularly, to a signal processing apparatus comprising upper, intermediate and lower processing layer processing sections, and a signal processing system for use in a packet communication system comprising two signal processing apparatuses connected with each other via a bus.

2. Description of the Related Art

In recent years, networking of computers has been rapidly advanced, and further, various kinds of computer peripheral units becomes commercially available. Accompanying with this, the connection states among computers and among a computer and various kinds of peripheral units become complicated. Also, the peripheral units become multifunctional, communication amounts between communication terminals increase, and a higher-speed more-convenient communication standard is therefore required.

In such circumstances, some interface standards of the next generation have been already proposed. Among them, the IEEE 1394 interface has been proposed as an interface for transferring data at a high speed among home digital devices and computers, and peripheral units. This interface standard has been proposed by the IEEE (The Institute of Electrical and Electronics Engineers, Inc.), and was specified as an IEEE std. 1394—1995 IEEE Standard for a high performance serial bus. It is a very convenient serial interface standard which is considered to be used at home because of supporting a synchronous transfer, active plug and play, and a connection state of a high degree of freedom while maintaining a high transfer speed of hundreds Mbits per second.

Further, an SBP-2 (Serial Bus Protocol 2) is as one of application protocols using the IEEE 1394 packet communication system. The SBP-2 has functions of efficiently transferring commands and data among various kinds of units or devices such as a disk drive unit, a magnetic tape drive unit, a printer, a scanner, a digital camera or the like, and notifying an operation state of the command, the results of the operation, or a state whether or not data transfer has been completed, to an application layer processing section which is located so as to be higher than a SBP-2 layer processing section.

FIG. 7 is a timing chart showing a sequence of communication in a first example of prior art which is performed between signal processing apparatuses 1a and 2a of packet communication apparatuses connected to each other via a serial data bus conformed with the IEEE 1394 interface standard.

Referring to FIG. 7, in the first example, the signal processing apparatus 1a comprises an upper layer processing section 11a having a data memory 112a, an intermediate layer processing section 12a having a data memory 121a, and a lower layer processing section 13a having a data memory 131a. On the other hand, the signal processing apparatus 2a comprises an upper layer processing section 21a having a data memory 212a, an intermediate layer processing section 22a having a data memory 221a, and a lower layer processing section 23a having a data memory 231a.

In the first example, when packet data 511 is transmitted from the signal processing apparatus 2a to the signal processing apparatus 1a, first of all, a data transmission request signal 510 is sent from the upper layer processing section 11a to the intermediate layer processing section 12a of the signal processing apparatus 1a. Transfer data 511 constructing a part of data 509 is also transmitted together with the data transmission request signal 510. In this case, the transfer data 511 is a piece of data obtained by dividing the data 509 by the upper layer processing section 11a into packet data each having the size equal to or smaller than a memory capacity of the data memory 131a of the lower layer processing section 13a because of limitation of the memory capacity of the data memory 131a. The transfer data 511 transmitted together with the data transmission request signal 510 is temporarily stored in the data memory 121a of the intermediate layer processing section 12a. The intermediate layer processing section 12a generates and outputs a Read/Write Request signal 513 to the lower layer processing section 13a, and transmits the transfer data 512 stored in the data memory 121a to the lower layer processing section 13a.

The Read/Write Request signal 513 represents transfer request which is issued by the intermediate layer processing section 12a for transferring the transfer data 512 stored in the data memory 121a of the intermediate layer processing section 12a to the intermediate layer processing section 22a of the signal processing apparatus 2a, and the Read/Write Request signal 513 is a part of control signals or means for controlling the configuration order of the transfer data, confirmation of arrival of the transfer data to the signal processing apparatus 2a of the other party, retransmission control and the like. These control signals include an Indication signal (Notification of Transfer), a Response signal (Notification of Response), and a Confirmation signal (Notification of Confirmation), which will be described hereinafter.

In response to the Read/Write Request signal 513, the lower layer processing section 13a transmits transfer data 514 transmitted from the intermediate layer processing section 12a via the data memory 131a of the lower layer processing section 13a and the serial data bus to the lower layer processing section 23a of the signal processing apparatus 2a.

The transfer data 514 is temporarily stored in the data memory 131a of the lower layer processing section 23a. Thereafter, the lower layer processing section 23a generates and outputs an Indication signal 516 to the intermediate layer processing section 22a of the signal processing apparatus 2a, and then, transmits the transfer data 515 stored in the data memory 231a to the intermediate layer processing section 22a. The intermediate layer processing section 22a temporarily stores the transfer data 517 received together with the Indication signal 516 into the data memory 221a of the intermediate layer processing section 22a. Then the intermediate layer processing section 22a generates and outputs a Response signal 518 to the lower layer processing section 23a, and further generates and outputs a Notification of Arrival signal 519 for the transfer data 517 to the upper layer processing section 21a of the signal processing apparatus 2a.

The checked result of the matching of the transfer data 517 transmitted by the intermediate layer processing section 22a is included in the above Response signal 518. If there is no problem with respect to the transfer data 517, a code indicative of Completion is included in the Response signal 518. On the other hand, if there is a problem, a code indicative of an Error is included in the Response signal 518. In response to the Notification of Arrival signal 519, the upper layer processing section 21a receives the transfer data 517 stored in the data memory 221a of the intermediate layer processing section 22a.

The Response signal 518 issued by the intermediate layer processing section 22a to the lower layer processing section 23a is received by the lower layer processing section 13a of the signal processing apparatus 1a. The above Response signal 518 is further transmitted as a Confirmation signal 520 from the lower layer processing section 13a to the intermediate layer processing section 12a. If the code of the Confirmation signal 520 is "Error", the transfer data 512 is retransmitted by the intermediate layer processing section 12a. On the other hand, if the code of the Confirmation signal 520 is "Complete", a Notification of Completion signal 521, indicating that the transmission of the transfer data 511 to the signal processing apparatus 2a has been completed, is transmitted from the intermediate layer processing section 12a to the upper layer processing section 11a. In response to the Notification of Completion signal 521, the upper layer processing section 11a sends a data transmission request signal of new transfer data 522 to the intermediate layer processing section 12a.

By repeating the above-mentioned process, the transmission of the data 509 from the signal processing apparatus 1a to the signal processing apparatus 2a is completed.

As an application technique of the first example of the prior art, there is a technique of continuously transmitting a plurality of transfer data without waiting for a Response signal to the transfer data from the destination apparatus of transmission after transmitting the transfer data via the intermediate layer processing section of the signal processing apparatus on data transmission side to the lower layer processing section. This application technique is referred as a second example of prior art.

FIG. 8 is a timing chart showing a sequence of communication in the second example of the prior art which is performed between signal processing apparatuses 1b and 2b.

Referring to FIG. 8, in the second example, the signal processing apparatus 1b comprises an upper layer processing section 11b, an intermediate layer processing section 12b, and a lower layer processing section 13b. On the other hand, the signal processing apparatus 2b comprises an upper layer processing section 21b, an intermediate layer processing section 22b, and a lower layer processing section 23b.

As shown in FIG. 8, in a manner similar to that of the first example of the prior art, transfer data 601 is transmitted from the upper layer processing section 11b via the intermediate layer processing section 12b to the lower layer processing section 13b of the signal processing apparatus 1b. At that time, in the intermediate layer processing section 12b, without waiting for reception of any Response signal 603 from the signal processing apparatus 2b for the transfer data 601 transmitted to the lower layer processing section 13b, transfer data 602 which has not been transmitted yet is transmitted to the lower layer processing section 13b. In the event of receiving the Response signal 603, the code of the received data is checked in a manner similar to that of the first example of the prior art. If the code of the received data is "Error", the transfer data 602 is retransmitted. On the other hand, if the code of the received data is "Complete", a Notification of Completion signal indicative of completion of transmission is sent from the intermediate layer processing section 12b to the upper layer processing section 11b. In response to the Notification of Completion signal, the upper layer processing section 11b sends a data transmission request signal for new transfer data to the intermediate layer processing section 12b.

In the first example of the prior art, by certainly handshaking between respective layer processing sections using the above-mentioned sequence of communication, it can be confirmed whether or not the data has been transferred without any problem. Further, since there are provided control signals or means for retransmitting data even in the case where a failure occurs and the data has not arrived at the signal processing apparatus of the destination, there is such an advantageous effect that data can be certainly transmitted.

In the second example of the prior art, since the intermediate layer processing section 12b of the signal processing apparatus 1b of the transfer data transmission side transmits untransmitted transfer data without waiting for any Response signal from the signal processing apparatus 2b of the destination of transmission, it is not necessary to provide no waiting time from the transmission of the transfer data until arrival of the Response signal to the transfer data from the signal processing apparatus 1b of the destination of transmission. As a result, high-speed data communication can be performed. The handshaking between respective layer processing sections is certainly carried out, and the reliability of data transmission is assured.

In the first conventional example, however, each time the upper layer processing section 11a confirms the Response signal to all the transfer data transmitted by the upper layer processing section 11a, the next transfer data is transmitted from the upper layer processing section 11a. Consequently, the number of handshaking between the upper layer processing section 11a and the intermediate layer processing section 12a remarkably increases, and this leads to disturbance of high-speed data communication between the signal processing apparatuses 1a and 2a.

In the second example of the prior art, the next transfer data is transmitted before receiving the Response signal from the signal processing apparatus 2b of the reception side. Consequently, when a failure occurs in the transfer data and the signal processing apparatus 2b of the reception side sends a Response signal of "Error" for the transfer data or returns no Response signal, upon retransmitting the transfer data in which a failure occurs from the signal processing apparatus 1b of the transmission side, it is necessary to provide an error control process of a large amount of calculation in order to correctly arrange the order of a plurality of transfer data in the signal processing apparatus 1b. The error control process makes the load on the application heavy, and this leads to interference for high-speed data communication.

SUMMARY OF THE INVENTION

An essential object of the present invention is therefore to provide a signal processing apparatus and a signal processing system, capable of performing data communication at higher speed by simplifying handshaking and the error control process without departing from the conventional control signals or means, namely, by using these control signals.

In order to achieve the aforementioned objective, according to one aspect of the present invention, there is provided a signal processing apparatus comprising an upper layer processing section, an intermediate layer processing section, and a lower layer processing section, the signal processing apparatus transmitting transfer data from the upper layer processing section via the intermediate layer processing section to the lower layer processing section, thereafter, transmitting the transfer data from the lower layer processing section to a destination apparatus via a bus, receiving a response signal sent from the destination apparatus in response to the transfer data at the lower layer processing section, and transmitting the received response signal via the intermediate layer processing section to the upper layer processing section, wherein the lower layer processing section comprises a first storage unit having a first memory capacity of a predetermined limited size for transfer data, the first storage unit temporarily storing transfer data upon transmitting the transfer data via the bus, wherein the intermediate layer processing section comprises a second storage unit having a second memory capacity larger than the limited size for transfer data, the second storage unit temporarily storing the transfer data upon receiving the transfer data from the upper layer processing section and transferring the received transfer data to the lower layer processing section, wherein the upper layer processing section transmits the transfer data of a size, which is larger than the first memory capacity and which is equal to or smaller than the second memory capacity, to the intermediate layer processing section, wherein the intermediate layer processing section receives the transfer data transmitted from the upper layer processing section, divides the transfer data into a plurality of divided data each having a size equal to or smaller than the limited size for transfer data, and transmits the divided data to the lower layer processing section, and wherein when there is untransmitted divided data upon receiving the response signal from the lower layer processing section, the intermediate layer processing section transmits the untransmitted divided data to the lower layer processing section without transmitting any response signal to the upper layer processing section.

According to another aspect of the present invention, there is provided a signal processing apparatus comprising an upper layer processing section, an intermediate layer processing section, and a lower layer processing section, the signal processing apparatus transmitting transfer data received by the lower layer processing section from a source apparatus via a bus, to the upper layer processing section via the intermediate layer processing section, transmitting a response signal to the transfer data from the intermediate layer processing section to the lower layer processing section, thereafter, transmitting the response signal from the lower layer processing section to the source apparatus via the bus, wherein the intermediate layer processing section comprises a storage unit having a predetermined memory capacity, wherein the intermediate layer processing section receives a plurality of transfer data from the lower layer processing section so that the received transfer data is not larger than the memory capacity, stores the received plurality of transfer data into the storage unit, and wherein in either one of the following cases:

(a) a first case where reception of the plurality of transfer data from the lower layer processing section is completed, and (b) a second case where transmission of the transfer data from the source apparatus is completed, the intermediate layer processing section transmits the plurality of transfer data stored in the storage unit to the upper layer processing section.

According to a further aspect of the present invention, there is provided a signal processing system for transmitting and receiving data between a first signal processing apparatus and a second signal processing apparatus via a bus, wherein the first signal processing apparatus comprises a first upper layer processing section, a first intermediate layer processing section, and a first lower layer processing section, the first signal processing apparatus transmitting transfer data from the first upper layer processing section via the first intermediate layer processing section to the first lower layer processing section, thereafter, transmitting the transfer data from the first lower layer processing section to the second signal processing apparatus via a bus, receiving a response signal sent from the second signal processing apparatus in response to the transfer data at the first lower layer processing section, and transmitting the received response signal via the first intermediate layer processing section to the first upper layer processing section, wherein the second signal processing apparatus comprises a second upper layer processing section, a second intermediate layer processing section, and a second lower layer processing section, the second signal processing apparatus transmitting transfer data received by the second lower layer processing section from the first signal processing apparatus via the bus, to the second upper layer processing section via the second intermediate layer processing section, transmitting a response signal to the transfer data from the second intermediate layer processing section to the second lower layer processing section, thereafter, transmitting the response signal from the second lower layer processing section to the first signal processing apparatus via the bus, wherein the first lower layer processing section comprises a first storage unit having a first memory capacity of a predetermined limited size for transfer data, the first storage unit temporarily storing transfer data upon transmitting the transfer data via the bus, wherein the first intermediate layer processing section comprises a second storage unit having a second memory capacity larger than the limited size for transfer data, the second storage unit temporarily storing the transfer data upon receiving the transfer data from the first upper layer processing section and transferring the received transfer data to the first lower layer processing section, wherein the first upper layer processing section transmits the transfer data of a size, which is larger than the first memory capacity and which is equal to or smaller than the second memory capacity, to the first intermediate layer processing section, wherein the first intermediate layer processing section receives the transfer data transmitted from the first upper layer processing section, divides the transfer data into a plurality of divided data each having a size equal to or smaller than the limited size for transfer data, and transmits the divided data to the first lower layer processing section, wherein when there is untransmitted divided data upon receiving the response signal from the first lower layer processing section, the first intermediate layer processing section transmits the untransmitted divided data to the first lower layer processing section without transmitting any response signal to the first upper layer processing section, wherein the second intermediate layer processing section comprises a third storage unit having a predetermined third memory capacity, wherein the second intermediate layer processing section receives a plurality of transfer data from the second lower layer processing section so that the received transfer data is not larger than the third memory capacity, stores the received plurality of transfer data into the third storage unit, and wherein in either one of the following cases:
(a) a first case where reception of the plurality of transfer data from the second lower layer processing section is completed, and
(b) a second case where transmission of the transfer data from the first signal processing apparatus is completed, the second intermediate layer processing section transmits the plurality of transfer data stored in the third storage unit to the second upper layer processing section.

According to a still further aspect of the present invention, there is provided a signal processing apparatus comprising an upper layer processing section, an intermediate layer processing section, and a lower layer processing section, the signal processing apparatus transmitting transfer data from the upper layer processing section via the intermediate layer processing section to the lower layer processing section, thereafter, transmitting the transfer data from the lower layer processing section to a destination apparatus via a bus, receiving a response signal sent from the destination apparatus in response to the transfer data at the lower layer processing section, and transmitting the received response signal via the intermediate layer processing section to the upper layer processing section, wherein the intermediate layer processing section divides the transfer data received from the upper layer processing section into a plurality of divided data, and transmits the plurality of divided data to the lower layer processing section in a continuous sequential form of set of predetermined plural number of divided data.

In the above-mentioned signal processing apparatus, when the response signal, which corresponds to the divided data and which is received from the destination apparatus via the lower layer processing section, indicates that the divided data is normally received by the destination apparatus, the intermediate processing section transmits untransmitted divided data to the lower layer processing section, and wherein when the received response signal indicates that the divided data is not normally received by the destination apparatus, the intermediate processing section retransmits divided data which is not normally received by the destination apparatus, to the lower layer processing section.

In the above-mentioned signal processing apparatus, in response to a response signal which corresponds to each of the divided data, which is received from the destination apparatus via the lower layer processing section, and indicates that the divided data is normally received by the destination apparatus, when the received response signal is a response signal corresponding to predetermined divided data, the intermediate layer processing section transmits untransmitted divided data to the lower layer processing section, and wherein when the received response signal is different from a response signal corresponding to the oldest divided data among the divided data whose corresponding response signal is not received by the intermediate layer processing section, the intermediate layer processing section retransmits to the lower layer processing section the oldest divided data among the divided data whose corresponding response signal is not received by the intermediate layer processing section, and transmits untransmitted divided data to the lower layer processing section.

In the above-mentioned signal processing apparatus, in response to a response signal which corresponds to each of the divided data, which is received from the destination apparatus via the lower layer processing section, and indicates that the divided data is normally received by the destination apparatus, when the received response signal is a response signal corresponding to predetermined divided data, the intermediate layer processing section transmits untransmitted divided data to the lower layer processing section, and wherein when any response signal corresponding to a transmitted divided data is not received by the intermediate layer processing section within a predetermined time interval from transmission of the divided data, the intermediate layer processing section retransmits to the lower layer processing section, the transmitted divided data whose corresponding response signal is not received by the intermediate layer processing section, and transmits untransmitted divided data to the lower layer processing section.

In the above-mentioned signal processing apparatus, in response to a response signal which corresponds to each of the divided data, which is received from the destination apparatus via the lower layer processing section, and indicates that the divided data is normally received by the destination apparatus, when the received response signal is a response signal corresponding to predetermined divided data, the intermediate layer processing section transmits untransmitted divided data to the lower layer processing section, wherein when the received response signal is different from a response signal corresponding to the oldest divided data among the divided data whose corresponding response signal is not received by the intermediate layer processing section, the intermediate layer processing section retransmits to the lower layer processing section, the oldest divided data among the divided data whose corresponding response signal is not received by the intermediate layer processing section, and transmits untransmitted divided data to the lower layer processing section, and wherein when any response signal corresponding to a transmitted divided data is not received by the intermediate layer processing section within a predetermined time interval from transmission of the divided data, the intermediate layer processing section retransmits to the lower layer processing section, the transmitted divided data whose corresponding response signal is not received by the intermediate layer processing section, and transmits untransmitted divided data to the lower layer processing section.

According to a still more further aspect of the present invention, there is provided a signal processing apparatus comprising an upper layer processing section, an intermediate layer processing section, and a lower layer processing section, the signal processing apparatus transmitting transfer data received by the lower layer processing section from a source apparatus via a bus, to the upper layer processing section via the intermediate layer processing section, transmitting a response signal to the transfer data from the intermediate layer processing section to the lower layer processing section, thereafter, transmitting the response signal from the lower layer processing section to the source apparatus via the bus, and wherein in either one of the following cases:
(a) a first case where the transfer data from the lower layer processing section cannot be normally received by the intermediate layer processing section, and
(b) a second case where the transfer data from the lower layer processing section cannot be received at all by the intermediate layer processing section,
the intermediate layer processing section transmits a response signal for request for retransmission of the transfer data, and rearranges not only transfer data retransmitted from the source apparatus in response to the response signal for request, but also transfer data which has been already received in accordance with a predetermined rule.

According to a more still further aspect of the present invention, there is provided a signal processing system for transmitting and receiving data between a first signal processing apparatus and a second signal processing apparatus via a bus, wherein the first signal processing apparatus comprises a first upper layer processing section, a first intermediate layer processing section, and a first lower layer processing section, the first signal processing apparatus transmitting transfer data from the first upper layer processing section via the first intermediate layer processing section to the first lower layer processing section, thereafter, transmitting the transfer data from the first lower layer processing section to the second signal processing apparatus via the bus, receiving a response signal sent from the second signal processing apparatus in response to the transfer data at the first lower layer processing section, and transmitting the received response signal via the first intermediate layer processing section to the first upper layer processing section, wherein second signal processing apparatus comprises a second upper layer processing section, a second intermediate layer processing section, and a second lower layer processing section, the second signal processing apparatus transmitting transfer data received by the second lower layer processing section from the first signal processing apparatus via the bus, to the second upper layer processing section via the second intermediate layer processing section, transmitting a response signal to the transfer data from the second intermediate layer processing section to the second lower layer processing section, thereafter, transmitting the response signal from the second lower layer processing section to the first signal processing apparatus via the bus, wherein the first intermediate layer processing section divides the transfer data received from the first upper layer processing section into a plurality of divided data, and transmits the plurality of divided data to the first lower layer processing section in a continuous sequential form of set of predetermined plural number of divided data, and wherein in either one of the following cases:
(a) a first case where the transfer data from the second lower layer processing section cannot be normally received by the second intermediate layer processing section, and
(b) a second case where the transfer data from the second lower layer processing section cannot be received at all by the second intermediate layer processing section,
the second intermediate layer processing section transmits a response signal for request for retransmission of the transfer data, and rearranges not only transfer data retransmitted from the first signal processing apparatus in response to the response signal for request, but also transfer data which has been already received in accordance with a predetermined rule.

In the above-mentioned signal processing apparatus, the bus is preferably a wired circuit conformed with an IEEE 1394 interface standard, and a protocol conformed with SBP-2 (Serial Bus Protocol 2) described in the IEEE 1394 interface standard is preferably used as an application protocol used in the intermediate layer processing section.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 7 is a timing chart showing a sequence of communication in a first example of prior art which is performed between signal processing apparatuses 1a and 2a.

DETAILED DESCRIPTION OF THE PREFERRED EMBODIMENTS

Preferred embodiments according to the present invention will be described below with reference to the attached drawings. The following preferred embodiments are examples of embodying the present invention and the technical scope of the invention is not limited by the present preferred embodiments.

First Preferred Embodiment

Figure 1:
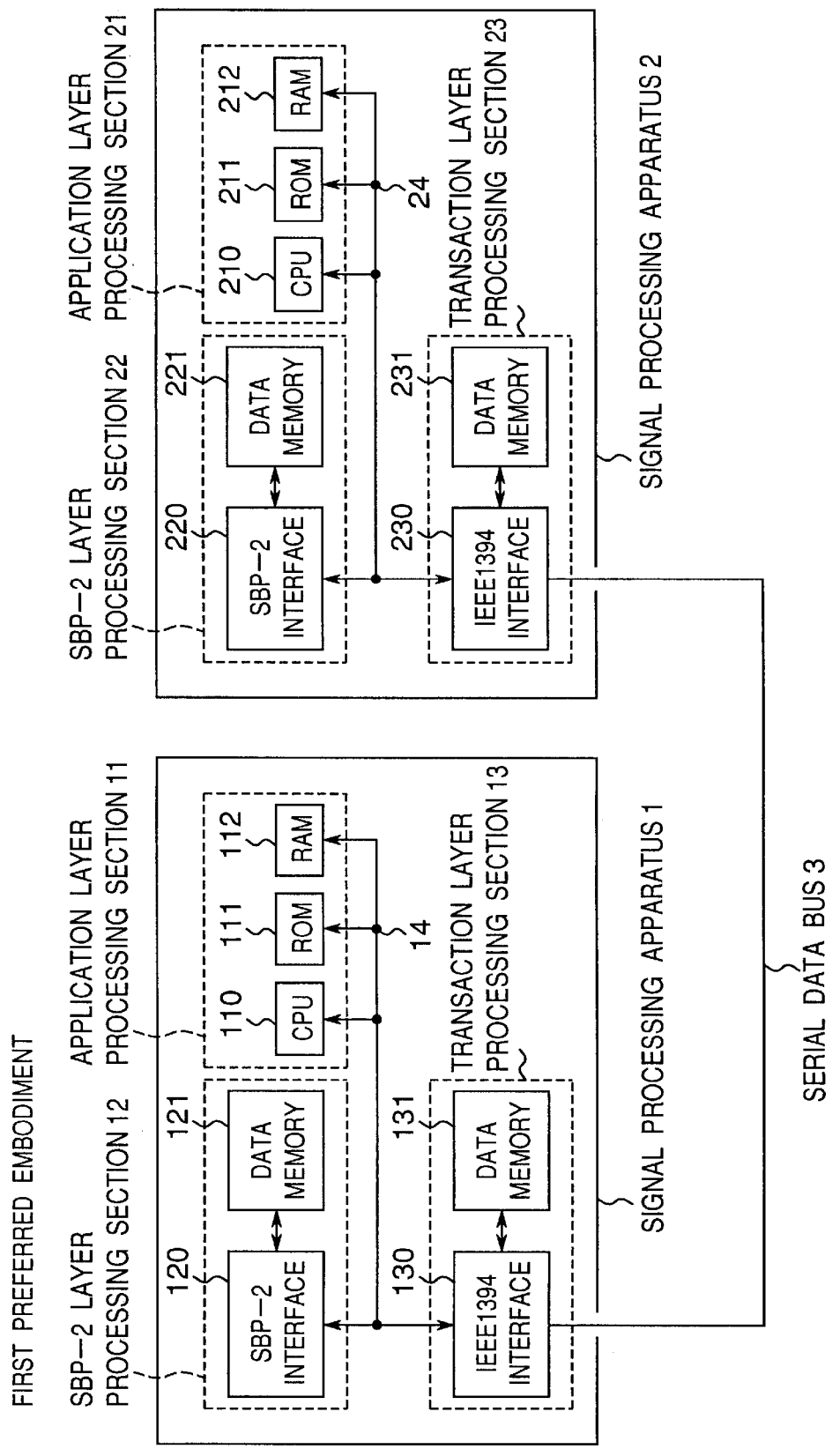
FIG. 1 is a block diagram showing a configuration of a packet communication system comprising signal processing apparatuses 1 and 2 which are connected via a serial data bus 3, according to a first preferred embodiment of the present invention.
Figure 2:
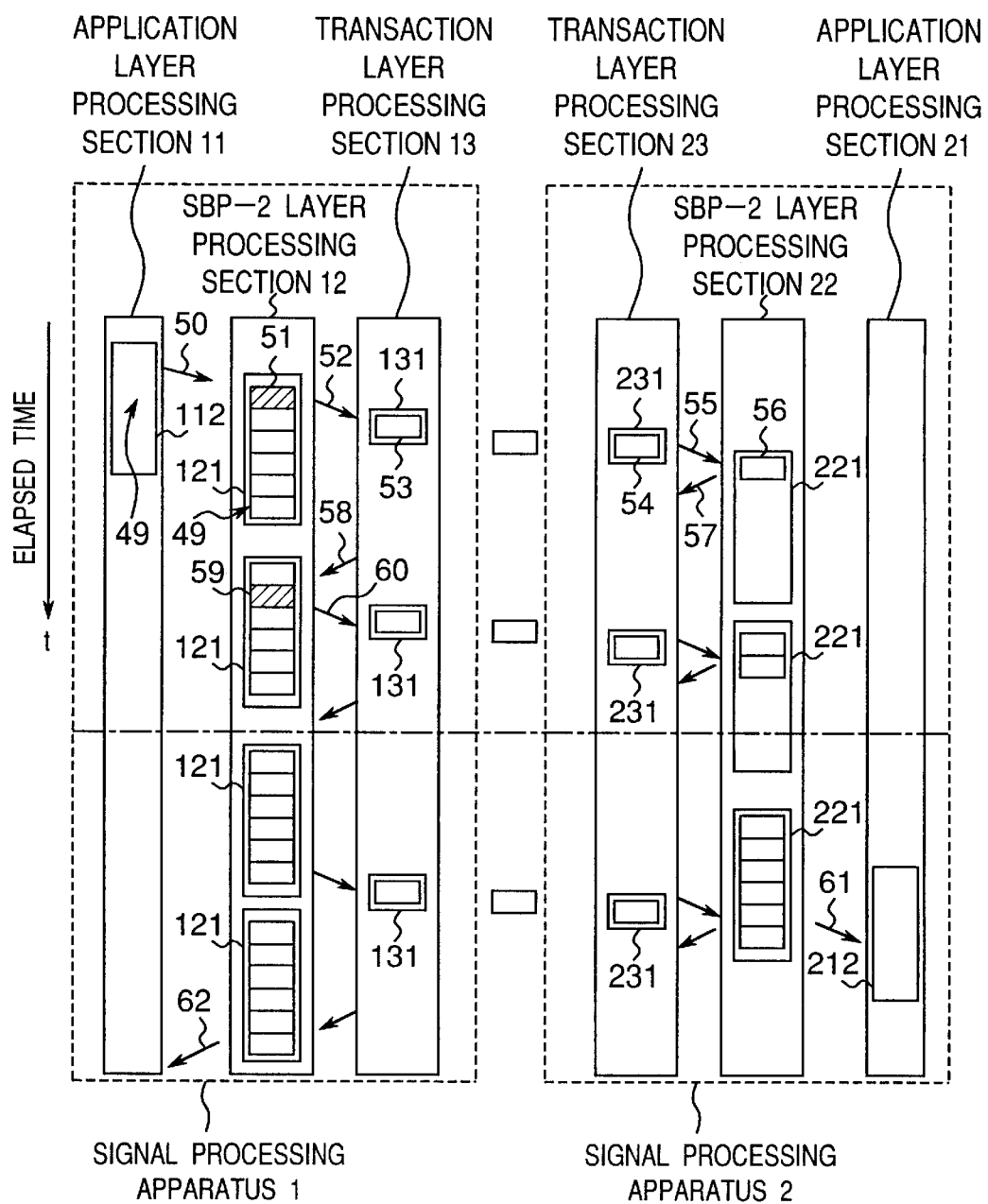
FIG. 2 is a timing chart showing a sequence of communication between the signal processing apparatuses 1 and 2 of FIG. 1.

FIG. 1 is a block diagram showing a configuration of a packet communication system comprising signal processing apparatuses 1 and 2 which are connected via a serial data bus 3, according to a first preferred embodiment of the present invention, and FIG. 2 is a timing chart showing a sequence of communication between the signal processing apparatuses 1 and 2 of FIG. 1. The details of the signal processing apparatuses 1 and 2 according to the first preferred embodiment will now be described.

The signal processing apparatus according to the preferred embodiment is embodied by, for example, hardware as shown in the block diagram of FIG. 1.

Referring to FIG. 1, the packet communication system of the present preferred embodiment comprises a signal processing system which includes the signal processing apparatus 1 of a packet communication apparatus, and the signal processing apparatus 2 of a packet communication apparatus, which are connected via the serial data bus 3 conformed with the IEEE 1394 interface standard. The signal processing apparatus 1 fundamentally comprises an application layer processing section 11 of an upper layer processing section, an SBP-2 processing section 12 of an intermediate or transport layer processing section, and a transaction layer processing section 13. Also, The signal processing apparatus 2 fundamentally comprises an application layer processing section 21 of an upper layer processing section, an SBP-2 processing section 22 of an intermediate or transport layer processing section, and a transaction layer processing section 23.

The signal processing apparatus 1 comprises a CPU (central processing unit) 110, a ROM (read-only memory) 111, a RAM (random access memory) 112, an SBP-2 interface 120 connected to a data memory 121, and an IEEE 1394 interface 130 connected to a data memory 131 for transmission and reception, where these circuits 110, 111, 112, 120 and 130 are connected via an internal bus 14.

The application layer processing section 11 is constituted by the CPU 110, the ROM 111 and the RAM 112. The CPU 110 is of a digital computer, and executes operating system programs and application programs stored in the ROM 111 to control the operation and process of the signal. The ROM 111 stores basic programs such as operation programs, application programs and data required for execution of these programs. The RAM 112 operates as a working memory of the CPU 110 and a data memory of the application layer processing section 11, and temporarily stores parameters and data needed for the operation and process of the signal processing apparatus 1.

The SBP-2 layer processing section 12 is constituted by the SBP-2 interface 120 and the data memory 121. The SBP-2 interface 120 performs signal conversion, and transmits and receives packet data to and from an SBP-2 interface 220 of the signal processing apparatus 2, using the data memory 121 according to a communication protocol conformed to the SBP-2 described in ANSI National Committee for Information Technology Standard (NCTIS) 325—1998 of the IEEE 1394 interface standard.

The transaction processing apparatus 13 is constituted by the IEEE 1394 interface 130 and the data memory 131. The IEEE 1394 interface 130 performs signal conversion, and transmits and receives packet data to and from an IEEE 1394 interface 230 of the signal processing apparatus 2, using the data memory 131 according to a communication protocol conformed to the IEEE 1394 interface standard.

The signal processing apparatus 1 transmits transfer packet data from the application layer processing section 11 via the SBP-2 layer processing section 12 to the transaction layer processing section 13, thereafter, transmits the transfer packet data from the transaction layer processing section 13 to the signal processing apparatus 2 of a destination apparatus via the serial data bus 3, receives a response signal sent from the signals processing apparatus 2 in response to the transfer packet data at the transaction layer processing section 13, and transmits the received response signal via the SBP-2 layer processing section 12 to the application layer processing section 11.

In the signal processing apparatus 1, the data memory 131 has a first memory capacity of a predetermined limited size for transfer data, and temporarily stores transfer packet data upon transmitting the transfer packet data via the serial data bus 3. The data memory 121 has a second memory capacity larger than the limited size for transfer data, and temporarily stores the transfer packet data upon receiving the transfer packet data from the application layer processing section 11 and transfers the received transfer packet data to the transaction layer processing section 13.

The application layer processing section 11 transmits the transfer packet data of a size, which is larger than the first memory capacity and which is equal to or smaller than the second memory capacity, to the SBP-2 layer processing section 12. The SBP-2 layer processing section 12 receives the transfer packet data transmitted from the application layer processing section 11, divides the transfer packet data into a plurality of divided packet data each having a size equal to or smaller than the limited size for transfer data, and transmits the divided packet data to the transaction layer processing section 13. When there is untransmitted divided packet data upon receiving the response signal from the transaction layer processing section 13, the SBP-2 layer processing section 12 transmits the untransmitted divided packet data to the transaction layer processing section 13 without transmitting any response signal to the application layer processing section 11.

The signal processing apparatus 2 comprises a CPU 210, a ROM 211, a RAM 212, an SBP-2 interface 220 connected to a data memory 221, and an IEEE 1394 interface 230 connected to a data memory 231 for transmission and reception, in a manner similar to that of the signal processing apparatus 1, where these circuits 210, 211, 212, 220 and 230 are connected via an internal bus 24.

The application layer processing section 21 is constituted by the CPU 210, the ROM 211 and the RAM 212. The SBP-2 layer processing section 22 is constituted by the SBP-2 interface 220 and the data memory 221. The transaction processing apparatus 23 is constituted by the IEEE 1394 interface 230 and the data memory 231.

The signal processing apparatus 2 transmits transfer packet data received by the transaction layer processing section 23 from the signal processing apparatus 1 of a source apparatus via the serial data bus 3, to the application layer processing section 21 via the SBP-2 layer processing section 22, transmits a response signal to the transfer packet data from the SBP-2 layer processing section 22 to the transaction layer processing section 23, thereafter, transmits the response signal from the transaction layer processing section 23 to the signal processing apparatus 1 via the serial data bus 3.

In the signal processing apparatus 2, the data memory 231 has a predetermined third memory capacity. The SBP-2 layer processing section 22 receives a plurality of transfer packet data from the transaction layer processing section 23 so that the received transfer packet data is not larger than the third memory capacity, stores the received plurality of transfer packet data into the data memory 221. In either a first case where reception of the plurality of transfer packet data from the transaction layer processing section 23 is completed, or a second case where transmission of the transfer data from the signal processing apparatus 1 is completed, the SBP-2 layer processing section 22 transmits the plurality of transfer packet data stored in the data memory 231 to the application layer processing section 21.

In the packet communication system, the IEEE 1394 interface 130 is connected to the IEEE 1394 interface 230 via the serial data bus 3. In the preferred embodiments, for example, the signal processing apparatus 1 is used as a transmitter apparatus for packet data to be transferred, and the signal processing apparatus 2 is used as a receiver apparatus therefor.

Next, the process of the sequence of communication which is executed by the packet communication system of the first preferred embodiment will be described with reference to FIG. 2.

Referring to FIG. 2, first of all, the application layer processing section 11 of the signal processing apparatus 1 reads out data 49 from the RAM 112. The application layer processing section 11 sends a data transmission request signal 50 to the SBP-2 layer processing section 12, and then, transmits the data 49 to the SBP-2 layer processing section 12. The data 49 is temporarily stored in the data memory 121 of the SBP-2 layer processing section 12. In this case, since the size of the data 49 is not limited by the memory capacity of the data memory 131 of the transaction layer processing section 13 unlike the prior art because the memory capacity of the data memory 121 is larger than that of the limited size for transfer data, the number of transmission and reception can be reduced as compared with that of the prior art.

The SBP-2 layer processing section 12 divides the data 49 stored in the data memory 121 into a plurality of transfer packet data each having a size which can be stored in the data memory 131 of the transaction layer processing section 5. Then, the SBP-2 layer processing section 12 generates and outputs a Read/Write request signal 52 which is the same as that of the prior art to the transaction layer processing section 13, and transmits the head packet of the transfer packet data 51 among the transfer packet data which are divided as described above. The transmitted transfer data 51 is temporarily stored in the data memory 131 of the transaction layer processing section 13.

The transaction layer processing section 13 transmits the transfer packet data 53 stored in the data memory 131 to the signal processing apparatus 2 via the serial data bus 3. When the transmitted transfer packet data 53 is normally received by the signal processing apparatus 2, the signal processing apparatus 2 generates and outputs a Response signal 57 to the transfer packet data 53. The Response signal 57 is received by the transaction layer processing section 13 of the signal processing apparatus 1, and is further transmitted as a Confirmation signal 58 from the transaction layer processing section 13 to the SBP-2 layer processing section 12. When the code of the Confirmation signal 58 indicates "Complete", the SBP-2 layer processing section 12 generates and outputs a Read/Write request signal 60 to the transaction layer processing section 13 without transmitting any Notification of Transmission Completion signal of the transfer data 53 to the application layer processing section 13 unlike the prior art, and sends the second transfer packet data 59 among the transfer packet data 49 which have not been transmitted yet and which are stored in the data memory 121. On the other hand, when the code of the Confirmation signal 58 indicates "Error", the transfer packet data 51 is retransmitted with the above-mentioned procedure The process of issuing or generating and outputting the Read/Write Request signal and transmitting the transfer packet data which has not been transmitted yet is repeated until all of the untransmitted transfer packet data stored in the data memory 121 of the SBP-2 layer processing section 12 have been completely transmitted from the SBP-2 layer processing section 12 to the transaction layer processing section 13.

As described above, in the present preferred embodiment, after the data 49 to be transmitted is transmitted from the application layer processing section 11 to the SBP-2 layer processing section 12, the handshaking between the SBP-2 layer processing section 12 and the application layer processing section 11 is omitted until all the data 49 have been completely transmitted. When the SBP-2 layer processing section 12 transmits all of untransmitted transfer packet data stored in the data memory 121 and the Confirmation signal indicative of "Complete" is received with respect to all of the transfer data 49, the SBP-2 layer processing section 12 sends a Notification of Completion signal 62 indicative of completion of the transmission of the transfer data 49 to the application layer processing section 11.

In such a case where the data size of the transfer data 49 is larger than the size of data which can be stored by the data memory 121, namely, the memory capacity of the data memory 121, the application layer processing section 11 may divide the transfer data 49 into a plurality of packet data having a data size which can be stored by the data memory 121, namely, having a data size equal to or smaller than the memory capacity of the data memory 121, and then, sends the divided packet data to the SBP-2 layer processing section 12. Also, at the timing point when the application layer processing section 11 receives the Notification of Completion signal from the SBP-2 layer processing section 12, untransmitted data among the transfer data 49 is transmitted to the SBP-2 layer processing section 12.

As described above, the SBP-2 layer processing section 12 is provided with the data memory 121 having the memory capacity which is larger enough to receive and store the transfer data from the application layer processing section 11. Further, the transfer data 49 is transmitted to the SBP-2 layer processing section 12 without being limited by the memory capacity of the data memory 121 for transmission of the transaction layer processing section 13, the SBP-2 layer processing section 12 divides the transfer data 49 into a plurality of transfer packet data each having the size which is equal to or smaller than the memory capacity of the data memory 131 for transmission of the transaction layer processing section 13, and transmits the divided transfer packet data to the transaction layer processing section 13. In the case where the SBP-2 layer processing section 12 receives a Response signal to the transfer data from the signals processing apparatus 2 of the destination apparatus, when there is the divided transfer packet data which has not yet been transmitted, the untransmitted transfer data is transmitted without notifying the application layer processing section 11. This leads to simplify the handshaking between the application layer processing section 11 and the SBP-2 layer processing section 12 of the signal processing apparatus 1. As a result, the transmission at higher speed can be realized as compared with the prior art.

Next, the process of the signal processing apparatus 2 of the data reception side, namely, the destination side will now be described in detail with reference to FIG. 2.

Referring to FIG. 2, first of all, by the transaction layer processing section 23 of the signal processing apparatus 2, the transfer packet data 54 transmitted from the signal processing apparatus 1 via the serial data bus 3 is received by the transaction layer processing section 23. The received transfer packet data 54 is temporarily stored in the data memory 231 for reception of the transaction layer processing section 23. Then, the transaction layer processing section 23 generates and outputs the Indication signal 55 to the SBP-2 layer processing section 22 of the signal processing apparatus 2, and transmits transfer packet data 54 stored in the data memory 231 for reception to the SBP-2 layer processing section 22. The SBP-2 layer processing section 22 temporarily stores the transfer packet data 54 received together with the Indication signal 55 into the data memory 221 of the SBP-2 layer processing section 22.

The SBP-2 layer processing section 22 generates and outputs a Response signal 57 to the transfer packet data 54 to the transaction layer processing section 23. When the code of the Response signal 57 indicative of "Complete" is received by the signal processing apparatus 1 via the transaction layer processing section 23 and the serial data bus 3, the signal processing apparatus 2 can notify the signal processing apparatus 1 of reception of the transfer packet data 51 by the signal processing apparatus 2 without any problem. When received transfer packet data 56 is not normally received, the SBP-2 layer processing section 22 sends the Response 57 indicative of "Error", so as to request re-transmission of the transfer data 51 to the signal processing apparatus 1.

By performing the series of processes in the signal processing apparatus 2 a plurality of times, the plurality of transfer packet data of plural packets transmitted from the signal processing apparatus 1 is stored in the data memory 221. When there is no part for storing transfer data newly transmitted in the memory capacity of the data memory 221 or when the transmission of the transfer packet data from the signal processing apparatus 1 is completed, the SBP-2 layer processing section 22 generates and outputs a Notification of Arrival signal 61 to the application layer processing section 21 of the signal processing apparatus 2. The application layer processing section 21 which has received the Notification of Arrival signal 61 receives the plurality of transfer packet data stored in the data memory 221 of the SBP-2 layer processing section 22, in a lump or receives all the transfer packet data once.

As mentioned above, the SBP-2 layer processing section 22 is provided with the data memory 221 having the memory capacity large enough to receive a plurality of transfer packet data from the transaction layer processing section 23 and the plurality of transfer packet data are temporarily stored in the data memory 221 of the SBP-2 layer processing section 22, and then, are transmitted in a lump to the application layer processing section 21. This leads to reduction of the number of transmitting and receiving operations performed between the SBP-2 layer processing section 22 and the application layer processing section 21 as compared with that of the prior art. Thus, the higher-speed data reception can be realized in the signal processing apparatus 2.

By the combination of the signal processing apparatuses 1 and 2, there can be provided the packet communication system of the signal processing system capable of performing high-speed data communication.

Second Preferred Embodiment

Figure 3:
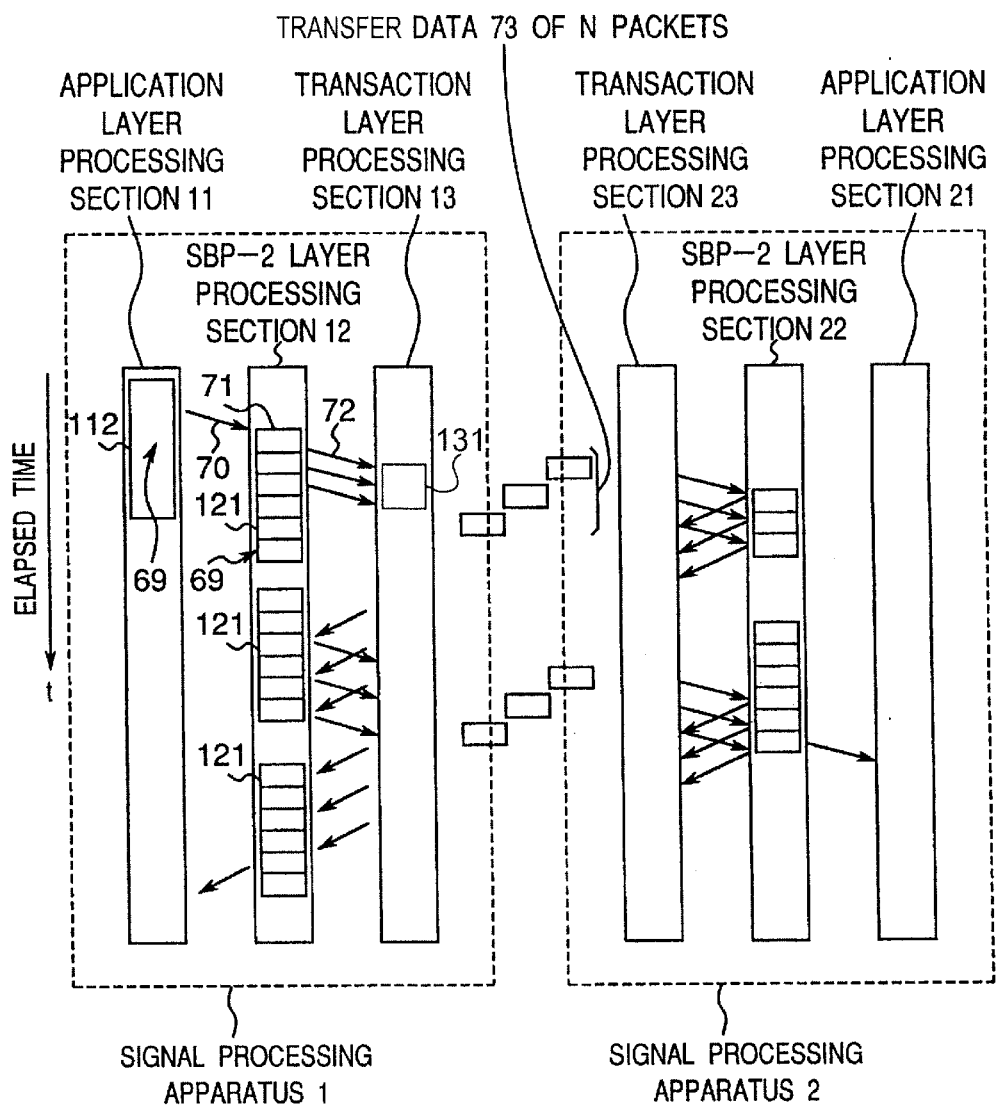
FIG. 3 is a timing chart showing a sequence of communication between the signal processing apparatuses 1 and 2 according to a second preferred embodiment of the present invention.

FIG. 3 is a timing chart showing a sequence of communication between the signal processing apparatuses 1 and 2 according to a second preferred embodiment of the present invention. The packet communication system of the signal processing system of the second preferred embodiment has the same structure as that of the first preferred embodiment shown in FIG. 1, however, the sequence of communication of the second preferred embodiment is different from that of the first preferred embodiment. These differences will be described in detail hereinafter.

The signal processing apparatus 1 of the second preferred embodiment is characterized in that the SBP-2 layer processing section 12 divides transfer data received from the application layer processing section 11 into a plurality of divided packet data, and transmits the plurality of divided packet data to the transaction layer processing section 13 in a continuous sequential form of set of predetermined plural number of divided packet data.

Referring to FIG. 3, first of all, a data transmission request signal 70 is sent from the application layer processing section 11 of the signal processing apparatus 1 of the data transmitter side or the source apparatus to the SBP-2 layer processing section 12, and then, data 69 is transmitted from the application layer processing section 11 to the SBP-2 layer processing section 12. The data 69 is temporarily stored in the data memory 121 of the SBP-2 layer processing section 12. The SBP-2 layer processing section 12 divides the data 69 stored in the data memory 121 into a plurality of transfer packet data 71 each having a data size which can be stored in the data memory 131 of the transaction layer processing section 13. The SBP-2 layer processing section 12 generates and outputs a Read/Write Request signal 72 to the transaction layer processing section 13, and then, transmits the transfer packet data 71 to the transaction layer processing section 13. The transmitted transfer packet data 71 is temporarily stored in the data memory 131 for transmission of the transaction layer processing section 13, and is transmitted by the transaction layer processing section 13 to the signal processing apparatus 2 of a data receiver side or a destination side. In this case, the SBP-2 layer processing section 12 transmits continuous transfer packet data 73 of N packets without waiting for any Response signal from the signal processing apparatus 2. In this case, N is the largest number of packets of transfer packet data transmitted and received between the signal processing apparatuses 1 and 2. When there is no error except for the transmission start and the transmission end, transfer packet data of N packet are always transmitted and received between the signal processing apparatuses 1 and 2. After completion of the transmission of the transfer packet data of N packets, a piece of transfer packet data is transmitted each time the Response signal to the transfer data transmitted from the signal processing apparatus 2 is received. By continuously transmitting and receiving the transfer packet data of N packets except for the communication start and end between the signal processing apparatuses 1 and 2, the communication time can be reduced. When an error occurs in the communication, an error control process as described below can be performed.

First Example of Error Control Process

Figure 4:
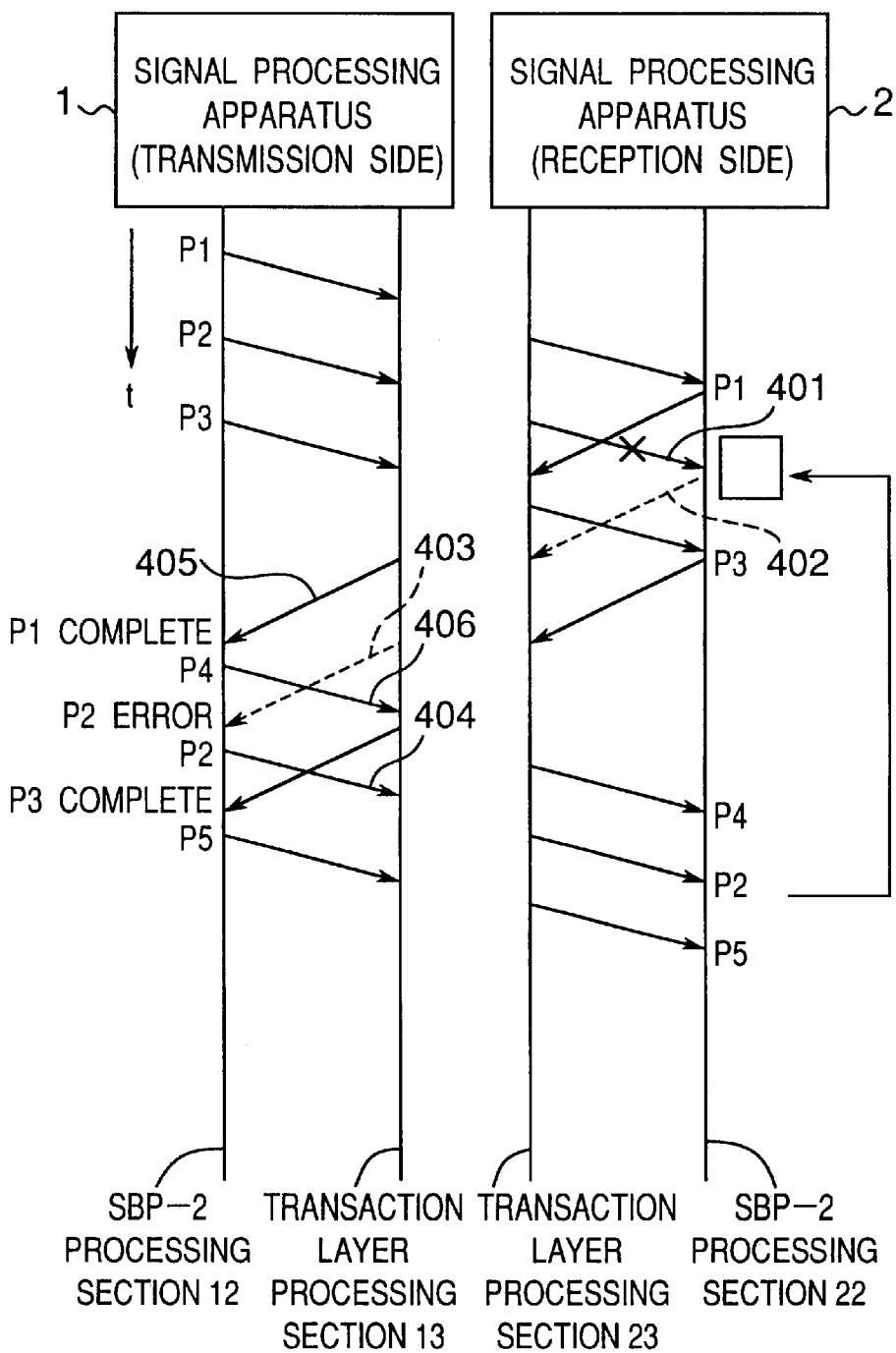
FIG. 4 is a timing chart showing a sequence of communication in a first example of an error control process which is performed between the signal processing apparatuses 1 and 2 according to the second preferred embodiment of the present invention.

FIG. 4 is a timing chart showing a sequence of communication in a first example of an error control process which is performed between the signal processing apparatuses 1 and 2 according to the second preferred embodiment of the present invention.

The first example of the error control process is characterized in the followings:
  (a) when the response signal, which corresponds to divided packet data and which is received from the signal processing apparatus 2 via the transaction layer processing section 13, indicates that the divided packet data is normally received by the signal processing apparatus 2, the SBP-2 layer processing section 12 transmits untransmitted divided packet data to the transaction layer processing section 13; and
  (b) when a received Response signal indicates that the divided packet data is not normally received by the signal processing apparatus 2, the SBP-2 processing section 12 retransmits divided packet data which is not normally received by the signal processing apparatus 2, to the transaction layer processing section 13.

Referring to FIG. 4, the error control process will be described in detail. It is assumed that the signal processing apparatus 2 of reception side executes a reception process in an order of the transfer data transmitted by the signals processing apparatus 1 of transmission side, and sends Response signals by using the "Ordered Model method" as described in the SBP-2 standard which has been known to those skilled in the art. For easier understanding, the number N of packets of transfer packet data to be transmitted and received is set to 3.

Referring to FIG. 4, first of all, a data retransmission process when the transfer packet data is received with an error message by the signal processing apparatus 2 of reception side will be described. As described with reference to FIG. 3, the signal processing apparatus 1 of transmission side transmits continuous transfer data of three packets. In this case, when transfer packet data 401 of frame number P2 is received erroneously by the signal processing apparatus 2 of reception side, a Response signal 402 indicative of "Error" is transmitted from the signal processing apparatus 2 to the signal processing apparatus 1. The Response signal 402 is received as a Confirmation signal 403 by the signal processing apparatus 1 of the transmission side. The signal processing apparatus 1 retransmits the transfer packet data 404 of frame number P2. Since a Response 405 indicative of "Complete" to the transfer packet data of frame number P1 has been already received by the signal processing apparatus 1 of the transmission side, with respect to the Response signal 405, transfer packet data 406 of frame number P4 is transmitted as untransmitted transfer packet data to the signal processing apparatus 2 of the reception side. As a result, the order of frame numbers of the transfer packet data received by the signal processing apparatus 2 of reception side is 1, –, 3, 4, 2, and 5.

When the transfer packet data is erroneously received by the signal processing apparatus 2 of the reception side, after the data retransmission process shown in FIG. 4, the signal processing apparatus 2 rearranges the plurality of transfer packet data received by the signal processing apparatus 2 of reception side in accordance with the order of frame numbers, where the order is in accordance with a predetermined rule. That is, a frame retransmitted due to the error coincides with a frame located before by integer times the number N. In this example, the frame retransmitted due to the error coincides with the frame located before by once the number N=3.

Second Example of Error Control Process

Figure 5:
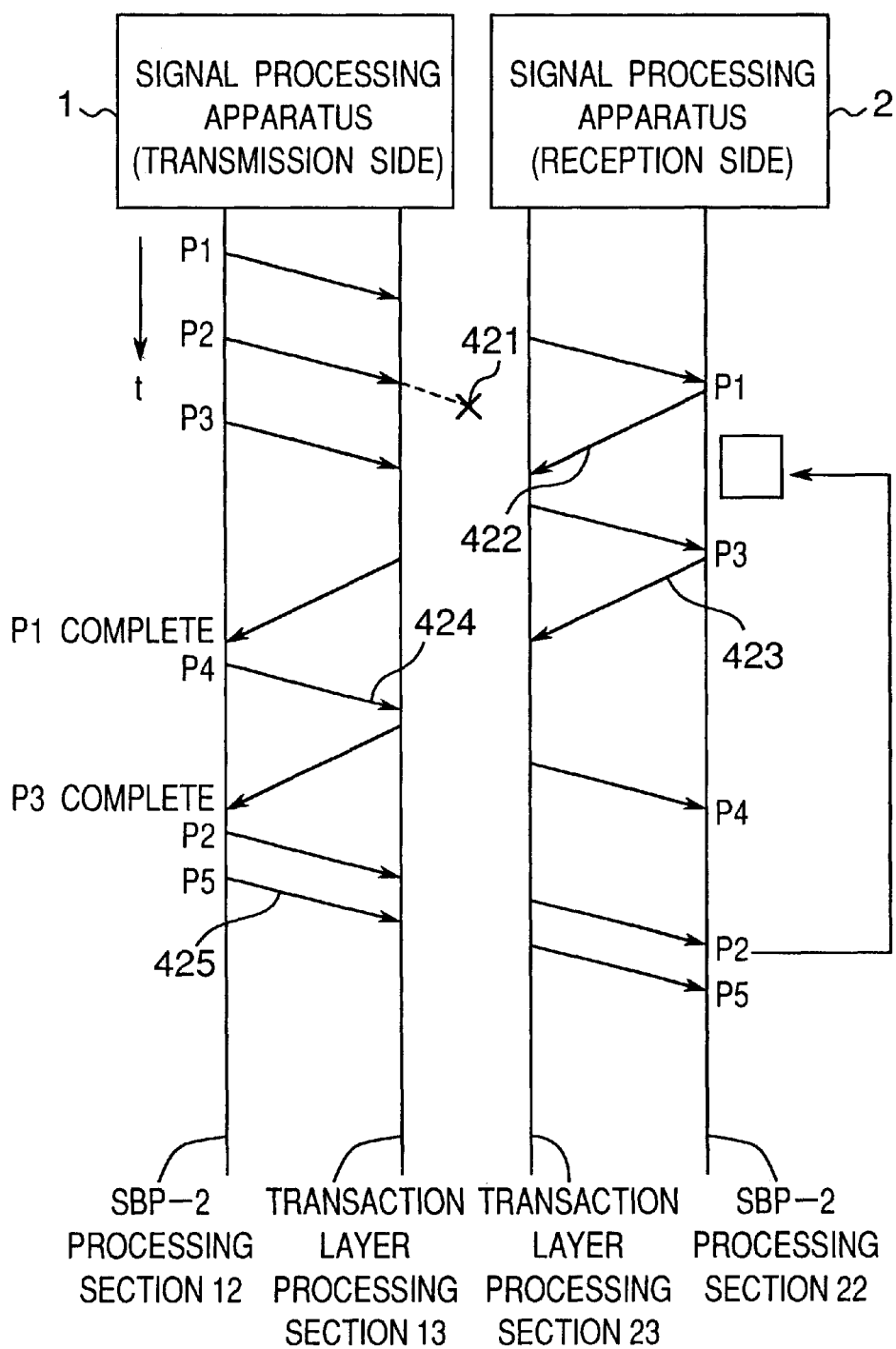
FIG. 5 is a timing chart showing a sequence of communication in a second example of an error control process which is performed between the signal processing apparatuses 1 and 2 according to the second preferred embodiment of the present invention.

FIG. 5 is a timing chart showing a sequence of communication in a second example of an error control process which is performed between the signal processing apparatuses 1 and 2 according to the preferred embodiment of the present invention.

The second example of the error control process is characterized in the followings:
  (a) in response to a Response signal which corresponds to each of divided packet data, which is received from the signal processing apparatus 2 of destination apparatus via the transaction layer processing section 13, and indicates that the divided packet data is normally received by the signal processing apparatus 2, when the received Response signal is a Response signal corresponding to predetermined divided packet data, the intermediate layer processing section 12 transmits untransmitted divided packet data to the transaction layer processing section 13; and
  wherein when the received Response signal is different from a Response signal corresponding to the oldest divided packet data among the divided packet data whose corresponding Response signal is not received by the SBP-2 layer processing section 12, the SBP-2 layer processing section 12 retransmits to the transaction layer processing section 13, the oldest divided packet data among the divided packet data whose corresponding Response signal is not received by the SBP-2 layer processing section 12, and transmits untransmitted divided data to the transaction layer processing section 13.

Referring to FIG. 5, the data retransmission process when the transfer packet data is not received by the signal processing apparatus 2 of reception side will be described.

As described with reference to FIG. 3, continuous transfer packet data of three packets are transmitted by the signal processing apparatus 1 of transmission side. In this case, when transfer packet data 421 of frame number P2 is lost for some reason, the signal processing apparatus 2 of reception side transmits Response signals 422 and 423 to the transfer packet data of frame numbers P1 and P3. The signal processing apparatus 1 of transmission side newly transmits transfer packet data 424 of frame number P4 in response to the Response signal 422. When the Response signal 423 is received by the signal processing apparatus 1, since the Response signal 423 is different from a Response signal corresponding to the oldest transfer packet data (in this case, the transfer packet data of frame number 2) among the transfer packet data which have been transmitted but not confirmed, before newly sending the transfer packet data 425 of frame number P5, the transfer packet data, which can be normally received by the signal processing apparatus 2 of the reception side has not been confirmed, is retransmitted in the order of transmission. In this case, only the transfer packet data of frame number 2 is retransmitted from the signal processing apparatus 1 to the signal processing apparatus 2. After that, the transfer data 425 is transmitted from the signal processing apparatus 1 to the signal processing apparatus 2. As a result, the order of frame numbers of the transfer packet data received by the signal processing apparatus 2 of reception side is 1, –, 3, 4, 2, and 5.

When the transfer packet data is not received by the signal processing apparatus 2 of reception side, the signal processing apparatus 2 performs the data retransmission process shown in FIG. 5, and rearranges the plurality of transfer packet data received by the signal processing apparatus 2 of on the reception side in accordance with the order of frame numbers, where the order is according to a predetermined rule. That is, a frame retransmitted due to an error coincides with a frame located before by integer times the number N. In this case, the frame retransmitted due to an error coincides with the frame located before by once the number N=3. This rule is the same as that of the first example of the error control process shown in FIG. 4.

As mentioned above, when the number of transfer packet data transmitted at once is set to a predetermined number N and an error occurs in the transmitted transfer packet data, the signal processing apparatus 1 performs a predetermined retransmission process, then the order of frame numbers of transfer packet data received by the signal processing apparatus 1 of reception side is according to the above-mentioned predetermined rule related to N. By using the rule, the operation of controlling or rearranging the order of frame numbers when any transfer packet data is not normally received can be made simpler. Further, since the above-mentioned predetermined rule related to N is the same as that in the first and second examples of the error control process shown in FIGS. 4 and 5, the same operation of controlling or rearranging the order of the frame numbers can be also used. As a result, the load of the error control process is lightened, and a high-speed communication can be realized in the packet communication system shown in FIG. 1.

Third Example of Error Control Process

Figure 6:
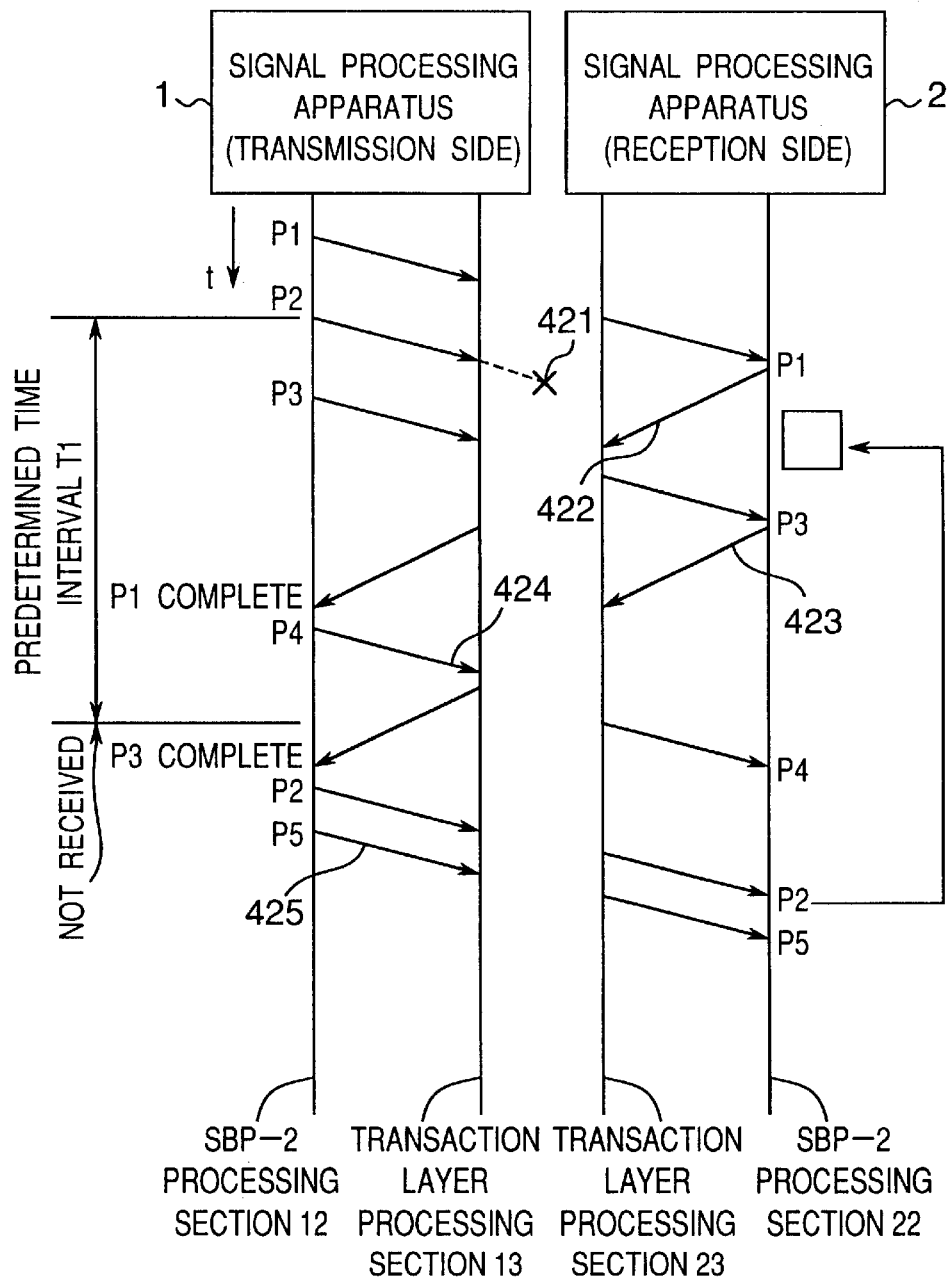
FIG. 6 is a timing chart showing a sequence of communication in a third example of an error control process which is performed between the signal processing apparatuses 1 and 2 according to the second preferred embodiment of the present invention.
Figure 7:
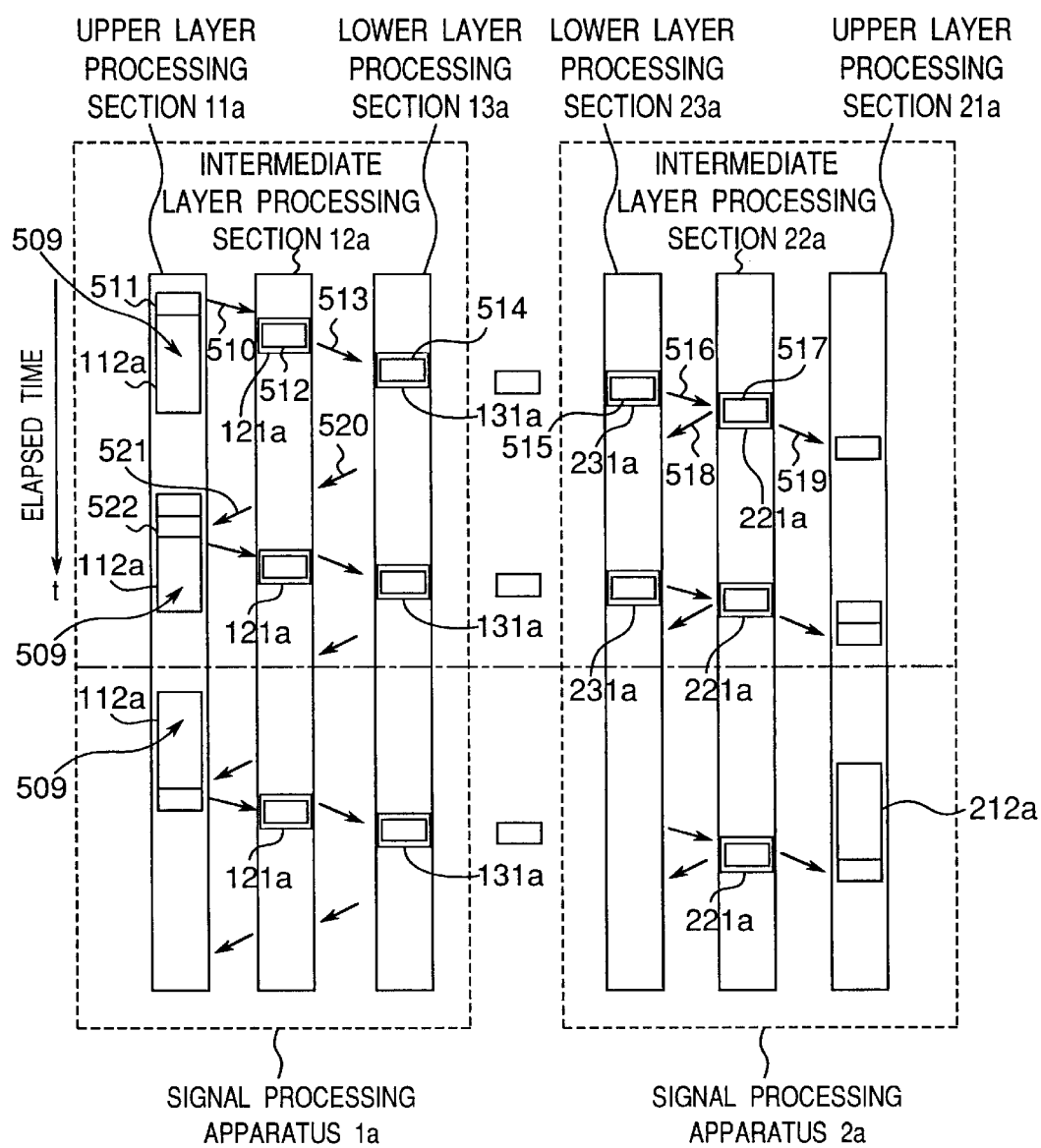
Figure 8:
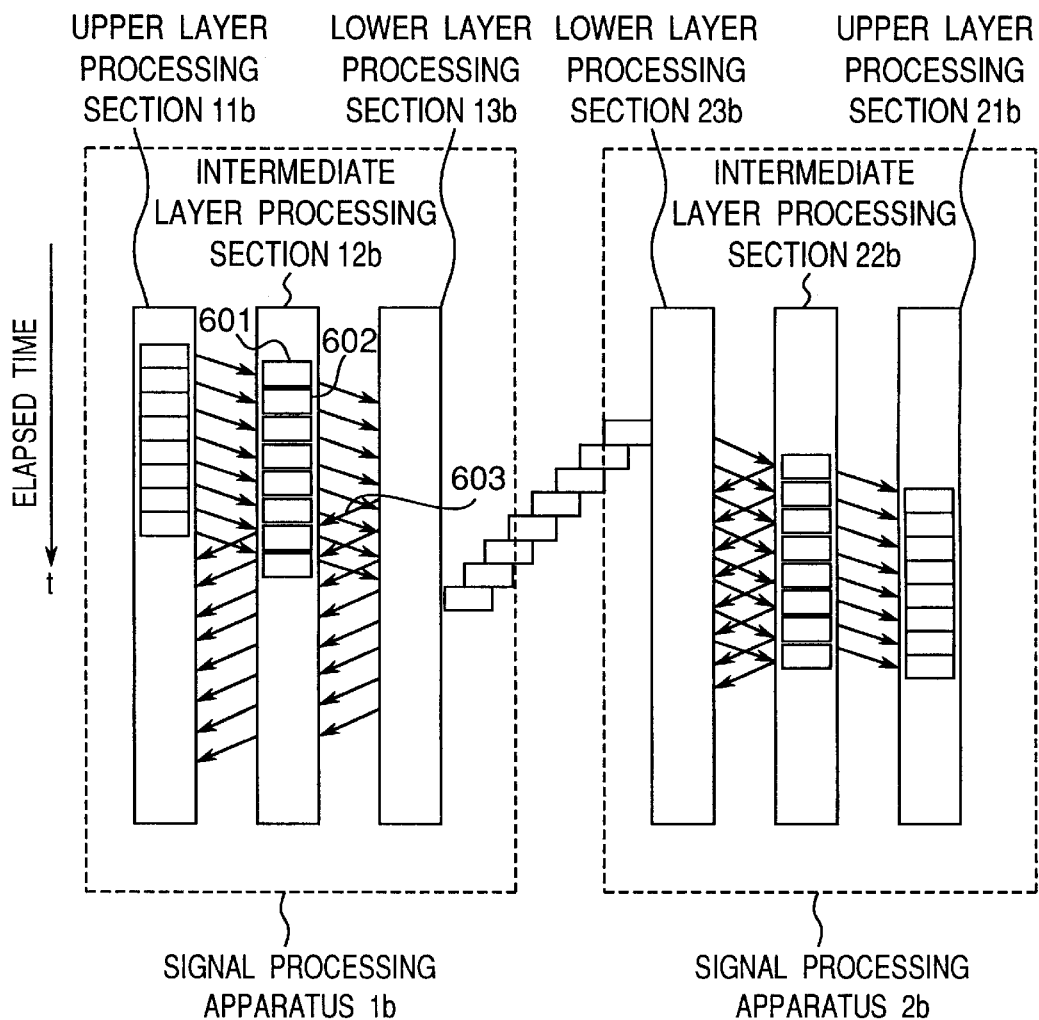
FIG. 8 is a timing chart showing a sequence of communication in a second example of prior art which is performed between signal processing apparatuses 1b and 2b.

FIG. 6 is a timing chart showing a sequence of communication in a third example of an error control process which is performed between the signal processing apparatuses 1 and 2 according to the preferred embodiment of the present invention.

The third example of the error control process is characterized in the followings:

(a) in response to a Response signal which corresponds to each of divided packet data, which is received from the signal processing apparatus 2 of destination apparatus via the transaction layer processing section 13, and indicates that the divided packet data is normally received by the signal processing apparatus 2, when the received Response signal is a response signal corresponding to predetermined divided packet data, the SBP-2 layer processing section 12 transmits untransmitted divided packet data to the transaction layer processing section 13; and (b) when any Response signal corresponding to a transmitted divided packet data is not received by the SBP-2 layer processing section 12 within a predetermined time interval T1 from transmission of the divided packet data, the SBP-2 layer processing section 12 retransmits to the transaction layer processing section 13, the transmitted divided packet data whose corresponding Response signal is not received by the SBP-2 layer processing section 12, and transmits untransmitted divided packet data to the transaction layer processing section 13.

In the case of FIG. 6, any Response signal corresponding to a transmitted divided packet data of frame number P2 is not received by the SBP-2 layer processing section 12 within a predetermined time interval T1 from transmission of the divided packet data of frame number P2, the SBP-2 layer processing section 12 retransmits to the transaction layer processing section 13, the transmitted divided packet data of frame number P2 whose corresponding Response signal is not received by the SBP-2 layer processing section 12.

The third example of the error control process has an action and advantageous effects similar to that of the second example of the error control process.

In the preferred embodiments, the third example of the error control process may be combined with the second example of the error control process.

Modified Preferred Embodiments

The present invention maybe variously modified. The number of transfer data continuously transmitted is not limited to three but can be set according to the performance or the like of the signal processing apparatuses 1 and 2.

As the communication protocol used in the SBP-2 layer processing sections 12 and 22, a communication protocol other than SBP-2 can be also used. Further, the present invention may be also applied to hardware other than that of the IEEE 1394 interface standard.

ADVANTAGEOUS EFFECTS OF PREFERRED EMBODIMENTS

According to the signal processing apparatus 1 of the preferred embodiment, after the transfer packet data is transmitted from the application layer processing section 11 to the SBP-2 layer processing section 12, it is not necessary for the application layer processing section 11 to confirm any Response signal to the transmitted transfer packet data until the transfer packet data stored in the data memory 121 of the SBP-2 layer processing section 12 is completely transmitted. Consequently, handshaking between the SBP-2 layer processing section 12 and the application layer processing section 11 is omitted, and as a result, the data transmission can be performed at a speed higher than that of the prior art.

According to the signal processing apparatus 2 of the preferred embodiment, the SBP-2 layer processing section 22 is provided with the data memory 221 having the memory capacity sufficient enough to receive a plurality of transfer packet data of packets from the transaction layer processing section 23, and then, the plurality of transfer packet data received are temporarily stored in the data memory 221 of the SBP-2 layer processing section 22, and are transmitted to the application layer processing section 23 in a lump. This lead to that the handshaking between the SBP-2 layer processing section 22 and the application layer processing section 21 can be omitted. As a result, the transfer packet data can be received at a speed higher than that of the prior art.

Further, according to the signal processing system of the preferred embodiments, it is not necessary for the signal processing apparatus 1 of transmission side, after transmitting transfer packet data from the application layer processing section 11 to the SBP-2 layer processing section 12, to confirm any response signal to the transmitted transfer packet data until the transfer packet data stored in the data memory 121 of the SBP-2 layer processing section 12 is completely transmitted. The handshaking between the SBP-2 layer processing section 12 and the application layer processing section 11 can be therefore omitted, and the transfer packet data can be accordingly transmitted at speed higher than that of the prior art.

In the signal processing apparatus 2 of reception side, the SBP-2 layer processing section 22 is provided with the data memory 221 having the memory capacity sufficient enough to receive a plurality of transfer packet data of packets from the transaction layer processing section 23. The plurality of transfer packet data received is temporarily stored in the data memory 221 of the SBP-2 layer processing section 22, and the plurality of transfer packet data are transmitted in a lump to the application layer processing section 21. This leads to omission of the handshaking between the SBP-2 layer processing section 22 and the application layer processing section 23. The transfer packet data can be accordingly received at a speed higher than that of the prior art. In the signal processing system constituted by combining the signal processing apparatuses 1 and 2, data communication can be established at a speed higher than that of the prior art.

According to the signal processing apparatus 1 of the preferred embodiment, the number of transfer packet data transmitted from the SBP-2 layer processing section 12 to the transaction layer processing section 13 is fixed to a predetermined number. When an error occurs in the transfer packet data, the transfer packet data can be retransmitted in accordance with the order of data arrival based on the above-mentioned predetermined rule. As a result, the error control process is simplified, and data transmission can be established at a speed higher than that of the prior art.

According to the signal processing apparatus 2 of the preferred embodiment, in the case where the SBP-2 layer processing section 22 receives and stores a plurality of transfer packet data from the transaction layer processing section 23, when the transfer packet data is retransmitted due to some error, the transfer packet data can be rearranged in accordance with the above-mentioned predetermined rule by the signal processing apparatus 2. Consequently, the error control process is simplified, and the load of the error control can be suppressed. As a result, data reception can be established at a speed higher than that of the prior art.

According to the signal processing system of the preferred embodiment, in the signal processing apparatus 1 of transmission side, the number of transfer packet data transmitted from the SBP-2 layer processing section 12 to the transaction layer processing section 13 is fixed to a predetermined number. Consequently, when an error occurs in the transfer packet data, the transfer packet data can be retransmitted in accordance with the order of arrival of transfer packet data based on the above-mentioned predetermined rule. As a result, the error control process can be simplified, and data transmission can be established at a speed higher than that of the prior art. In the case where the SBP-2 layer processing section 22 receives and stores the plurality of transfer packet data from the transaction layer processing section 23 of the signal processing apparatus 2, when the transfer packet data is retransmitted due to some error, the transfer packet data can be rearranged in accordance with the above-mentioned predetermined rule. Consequently, the error control process is simplified, and the load of the error control can be suppressed. As a result, data reception can be established at a speed higher than that of the prior art. Thus, in the signal processing system constituted by combining the signal processing apparatuses 1 and 2, data communication can be established at a speed higher than that of the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A signal processing apparatus comprising an upper layer processing section, an intermediate layer processing section, and a lower layer processing section, said signal processing apparatus transmitting transfer data from said upper layer processing section via said intermediate layer processing section to said lower layer processing section, thereafter, transmitting the transfer data from said lower layer processing section to a destination apparatus via a bus, receiving a response signal sent from said destination apparatus in response to the transfer data at said lower layer processing section, and transmitting the received response signal via said intermediate layer processing section to said upper layer processing section, wherein said lower layer processing section comprises a first storage unit having a first memory capacity of a predetermined limited size for transfer data, said first storage unit temporarily storing transfer data upon transmitting the transfer data via said bus, wherein said intermediate layer processing section comprises a second storage unit having a second memory capacity larger than the limited size for transfer data, said second storage unit temporarily storing the transfer data upon receiving the transfer data from said upper layer processing section and transferring the received transfer data to said lower layer processing section, wherein said upper layer processing section transmits the transfer data of a size, which is larger than the first memory capacity which is equal to or smaller than the second memory capacity, to said intermediate layer processing section, wherein said intermediate layer processing section receives the transfer data transmitted from said upper layer processing section, divides the transfer data into a plurality of divided data each having a size equal to or smaller than the limited size for transfer data, and transmits the divided data to said lower layer processing section, and wherein when there is untransmitted divided data upon receiving the response signal from said lower layer processing section, said intermediate layer processing section transmits the untransmitted divided data to said lower layer processing section without transmitting any response signal to said upper layer processing section.

2. The signal processing apparatus as claimed in claim 1, wherein said bus is a wired circuit conformed with an IEEE 1394 interface standard, and wherein a protocol conformed with SBP-2 (Serial Bus Protocol 2) described in the IEEE 1394 interface standard is used as an application protocol used in said intermediate layer processing section.

3. A signal processing apparatus comprising an upper layer processing section, an intermediate layer processing section, and a lower layer processing section, said signal processing apparatus transmitting transfer data received by said lower layer processing section from a source apparatus via a bus, to said upper layer processing section via said intermediate layer processing section, transmitting a response signal to the transfer data from said intermediate layer processing section to said lower layer processing section, thereafter, transmitting the response signal from said lower layer processing section to said source apparatus via said bus, wherein said intermediate layer processing section comprises a storage unit having a predetermined memory capacity, wherein said intermediate layer processing section receives a plurality of transfer data from said lower layer processing section so that the received transfer data is not larger than the memory capacity, stores the received plurality of transfer data into said storage unit, and wherein in either one of the following cases:

(a) a first case where reception of the plurality of transfer data from said lower layer processing section is completed, and (b) a second case where transmission of the transfer data from said source apparatus is completed, said intermediate layer processing section transmits the plurality of transfer data stored in said storage unit to said upper layer processing section.

4. The signal processing apparatus as claimed in claim 3, wherein said bus is a wired circuit conformed with an IEEE 1394 interface standard, and wherein a protocol conformed with SBP-2 (Serial Bus Protocol 2) described in the IEEE 1394 interface standard is used as an application protocol used in said intermediate layer processing section.

5. A signal processing system for transmitting and receiving data between a first signal processing apparatus and a second signal processing apparatus via a bus, wherein said first signal processing apparatus comprises a first upper layer processing section, a first intermediate layer processing section, and a first lower layer processing section, said first signal processing apparatus transmitting transfer data from said first upper layer processing section via said first intermediate layer processing section to said first lower layer processing section, thereafter, transmitting the transfer data from said first lower layer processing section to said second signal processing apparatus via a bus, receiving a response signal sent from said second signal processing apparatus in response to the transfer data at said first lower layer processing section, and transmitting the received response signal via said first intermediate layer processing section to said first upper layer processing section, wherein said second signal processing apparatus comprises a second upper layer processing section, a second intermediate layer processing section, and a second lower layer processing section, said second signal processing apparatus transmitting transfer data received by said second lower layer processing section from said first signal processing apparatus via said bus, to said second upper layer processing section via said second intermediate layer processing section, transmitting a response signal to the transfer data from said second intermediate layer processing section to said second lower layer processing section, thereafter, transmitting the response signal from said second lower layer processing section to said first signal processing apparatus via said bus, wherein said first lower layer processing section comprises a first storage unit having a first memory capacity of a predetermined limited size for transfer data, said first storage unit temporarily storing transfer data upon transmitting the transfer data via said bus, wherein said first intermediate layer processing section comprises a second storage unit having a second memory capacity larger than the limited size for transfer data, said second storage unit temporarily storing the transfer data upon receiving the transfer data from said first upper layer processing section and transferring the received transfer data to said first lower layer processing section, wherein said first upper layer processing section transmits the transfer data of a size, which is larger than the first memory capacity and which is equal to or smaller than the second memory capacity, to said first intermediate layer processing section, wherein said first intermediate layer processing section receives the transfer data transmitted from said first upper layer processing section, divides the transfer data into a plurality of divided data each having a size equal to or smaller than the limited size for transfer data, and transmits the divided data to said first lower layer processing section, wherein when there is untransmitted divided data upon receiving the response signal from said first lower layer processing section, said first intermediate layer processing section transmits the untransmitted divided data to said first lower layer processing section without transmitting any response signal to said first upper layer processing section, wherein said second intermediate layer processing section comprises a third storage unit having a predetermined third memory capacity, wherein said second intermediate layer processing section receives a plurality of transfer data from said second lower layer processing section so that the received transfer data is not larger than the third memory capacity, stores the received plurality of transfer data into said third storage unit, and wherein in either one of the following cases:
(a) a first case where reception of the plurality of transfer data from said second lower layer processing section is completed, and
(b) a second case where transmission of the transfer data from said first signal processing apparatus is completed, said second intermediate layer processing section transmits the plurality of transfer data stored in said third storage unit to said second upper layer processing section.

6. The signal processing apparatus as claimed in claim 5, wherein said bus is a wired circuit conformed with an IEEE 1394 interface standard, and wherein a protocol conformed with SBP-2 (Serial Bus Protocol 2) described in the IEEE 1394 interface standard is used as an application protocol used in each of said first and second intermediate layer processing sections.

7. A signal processing apparatus comprising an upper layer processing section, an intermediate layer processing section, and a lower layer processing section, said signal processing apparatus transmitting transfer data from said upper layer processing section via said intermediate layer processing section to said lower layer processing section, thereafter, transmitting the transfer data from said lower layer processing section to a destination apparatus via a bus, receiving a response signal sent from said destination apparatus in response to the transfer data at said lower layer processing section, and transmitting the received response signal via said intermediate layer processing section to said upper layer processing section, wherein said intermediate layer processing section divides the transfer data received from said upper layer processing section into a plurality of divided data, and transmits the plurality of divided data to said lower layer processing section in a continuous sequential form of set of predetermined plural number of divided data.

8. The signal processing apparatus as claimed in claim 7, wherein when the response signal, which corresponds to the divided data and which is received from said destination apparatus via said lower layer processing section, indicates that the divided data is normally received by said destination apparatus, said intermediate processing section transmits untransmitted divided data to said lower layer processing section, and wherein when the received response signal indicates that the divided data is not normally received by said destination apparatus, said intermediate processing section retransmits divided data which is not normally received by said destination apparatus, to said lower layer processing section.

9. The signal processing apparatus as claimed in claim 8, wherein said bus is a wired circuit conformed with an IEEE 1394 interface standard, and wherein a protocol conformed with SBP-2 (Serial Bus Protocol 2) described in the IEEE 1394 interface standard is used as an application protocol used in said intermediate layer processing section.

10. The signal processing apparatus as claimed in claim 7, wherein in response to a response signal which corresponds to each of the divided data, which is received from said destination apparatus via said lower layer processing section, and indicates that the divided data is normally received by said destination apparatus, when the received response signal is a response signal corresponding to predetermined divided data, said intermediate layer processing section transmits untransmitted divided data to said lower layer processing section, and wherein when the received response signal is different from a response signal corresponding to the oldest divided data among the divided data whose corresponding response signal is not received by said intermediate layer processing section, said intermediate layer processing section retransmits to said lower layer processing section, the oldest divided data among the divided data whose corresponding response signal is not received by said intermediate layer processing section, and transmits untransmitted divided data to said lower layer processing section.

11. The signal processing apparatus as claimed in claim 10, wherein said bus is a wired circuit conformed with an IEEE 1394 interface standard, and wherein a protocol conformed with SBP-2 (Serial Bus Protocol 2) described in the IEEE 1394 interface standard is used as an application protocol used in each of said first and second intermediate layer processing section.

12. The signal processing apparatus as claimed in claim 7, wherein in response to a response signal which corresponds to each of the divided data, which is received from said destination apparatus via said lower layer processing section, and indicates that the divided data is normally received by said destination apparatus, when the received response signal is a response signal corresponding to predetermined divided data, said intermediate layer processing section transmits untransmitted divided data to said lower layer processing section, and wherein when any response signal corresponding to a transmitted divided data is not received by said intermediate layer processing section within a predetermined time interval from transmission of the divided data, said intermediate layer processing section retransmits to said lower layer processing section, the transmitted divided data whose corresponding response signal is not received by said intermediate layer processing section, and transmits untransmitted divided data to said lower layer processing section.

13. The signal processing apparatus as claimed in claim 7, wherein in response to a response signal which corresponds to each of the divided data, which is received from said destination apparatus via said lower layer processing section, and indicates that the divided data is normally received by said destination apparatus, when the received response signal is a response signal corresponding to predetermined divided data, said intermediate layer processing section transmits untransmitted divided data to said lower layer processing section, wherein when the received response signal is different from a response signal corresponding to the oldest divided data among the divided data whose corresponding response signal is not received by said intermediate layer processing section, said intermediate layer processing section retransmits to said lower layer processing section, the oldest divided data among the divided data whose corresponding response signal is not received by said intermediate layer processing section, and transmits untransmitted divided data to said lower layer processing section, and wherein when any response signal corresponding to a transmitted divided data is not received by said intermediate layer processing section within a predetermined time interval from transmission of the divided data, said intermediate layer processing section retransmits to said lower layer processing section, the transmitted divided data whose corresponding response signal is not received by said intermediate layer processing section, and transmits untransmitted divided data to said lower layer processing section.

14. The signal processing apparatus as claimed in claim 7, wherein said bus is a wired circuit conformed with an IEEE 1394 interface standard, and wherein a protocol conformed with SBP-2 (Serial Bus Protocol 2) described in the IEEE 1394 interface standard is used as an application protocol used in said intermediate layer processing section.

15. A signal processing apparatus comprising an upper layer processing section, an intermediate layer processing section, and a lower layer processing section, said signal processing apparatus transmitting transfer data received by said lower layer processing section from a source apparatus; via a bus, to said upper layer processing section via said intermediate layer processing section, transmitting a response signal to the transfer data from said intermediate layer processing section to said lower layer processing section, thereafter, transmitting the response signal from said lower layer processing section to said source apparatus via said bus, and wherein in either one of the following cases:
(a) a first case where the transfer data from said lower layer processing section cannot be normally received by said intermediate layer processing section, and
(b) a second case where the transfer data from said lower layer processing section cannot be received at all by said intermediate layer processing section, said intermediate layer processing section transmits a response signal for request for retransmission of the transfer data, and rearranges not only transfer data retransmitted from said source apparatus in response to the response signal for request, but also transfer data which has been already received in accordance with a predetermined rule.

16. A signal processing system for transmitting and receiving data between a first signal processing apparatus and a second signal processing apparatus via a bus, wherein said first signal processing apparatus comprises a first upper layer processing section, a first intermediate layer processing section, and a first lower layer processing section, said first signal processing apparatus transmitting transfer data from said first upper layer processing section via said first intermediate layer processing section to said first lower layer processing section, thereafter, transmitting the transfer data from said first lower layer processing section to said second signal processing apparatus via said bus, receiving a response signal sent from said second signal processing apparatus in response to the transfer data at said first lower layer processing section, and transmitting the received response signal via said first intermediate layer processing section to said first upper layer processing section, wherein second signal processing apparatus comprises a second upper layer processing section, a second intermediate layer processing section, and a second lower layer processing section, said second signal processing apparatus transmitting transfer data received by said second lower layer processing section from said first signal processing apparatus via said second intermediate layer processing section, transmitting a response signal to the transfer data from said second lower layer processing section, thereafter, transmitting th response signal from said second lower layer processing section to said first signal processing apparatus via said bus, wherein said first intermediate layer processing section divides the transfer data received from said first upper layer processing section into a plurality of divided data, and transmits the plurality of divided data to said first lower layer processing section in a continuous sequential form of set of predetermined plural number of divided data, and wherein in either one of the following cases:
  (a) a first case where the transfer data from said second lower layer processing section cannot be normally received by said second intermediate layer processing section, and
  (b) a second case where the transfer data from said second lower layer processing section cannot be received at all by said second intermediate layer processing section, said second intermediate layer processing section transmits a response signal for request for retransmission of the transfer data, and rearranges not only transfer data retransmitted from said first signal processing apparatus in response to the response signal for request, but also transfer data which has been already received in accordance with a predetermined rule.

* * * * *